Figure 6:
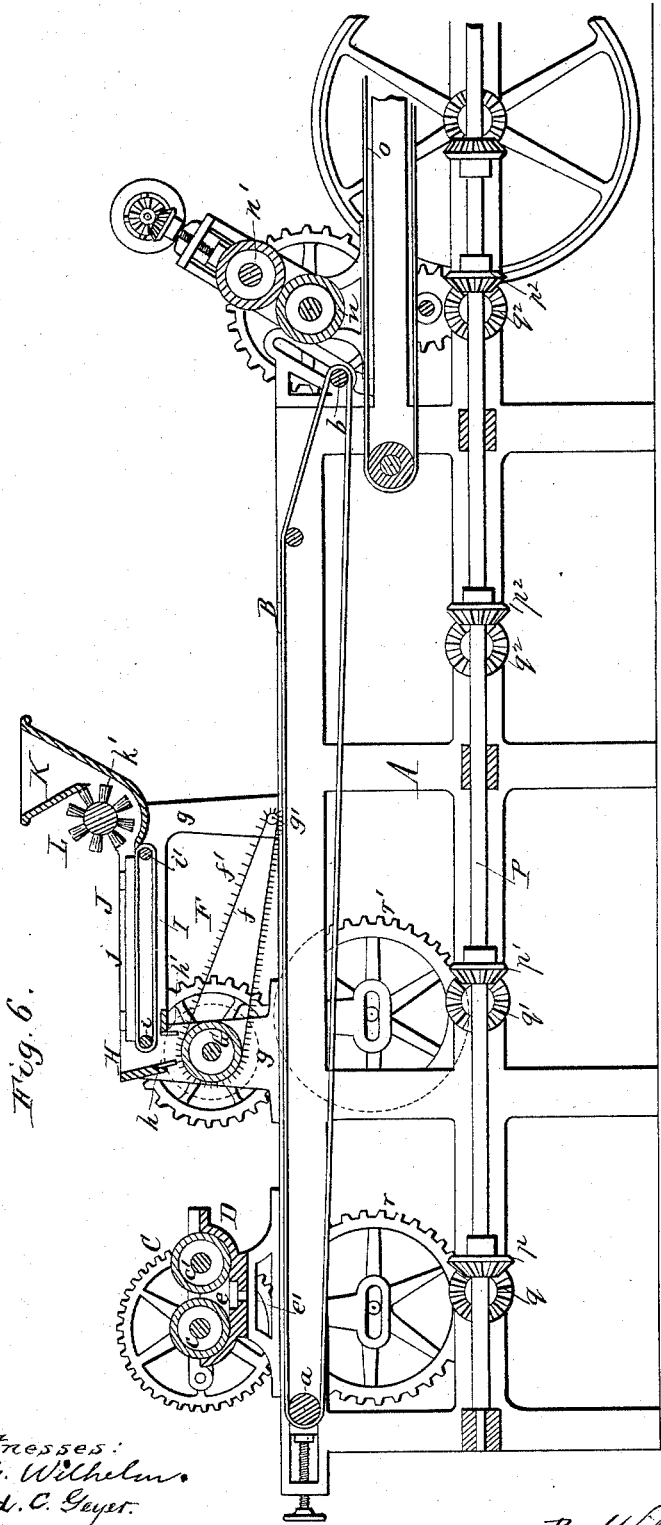

(No Model.) 3 Sheets—Sheet 1.
J. J. LANGLÉS.
CAKE MACHINE.
No. 485,201. Patented Nov. 1, 1892.
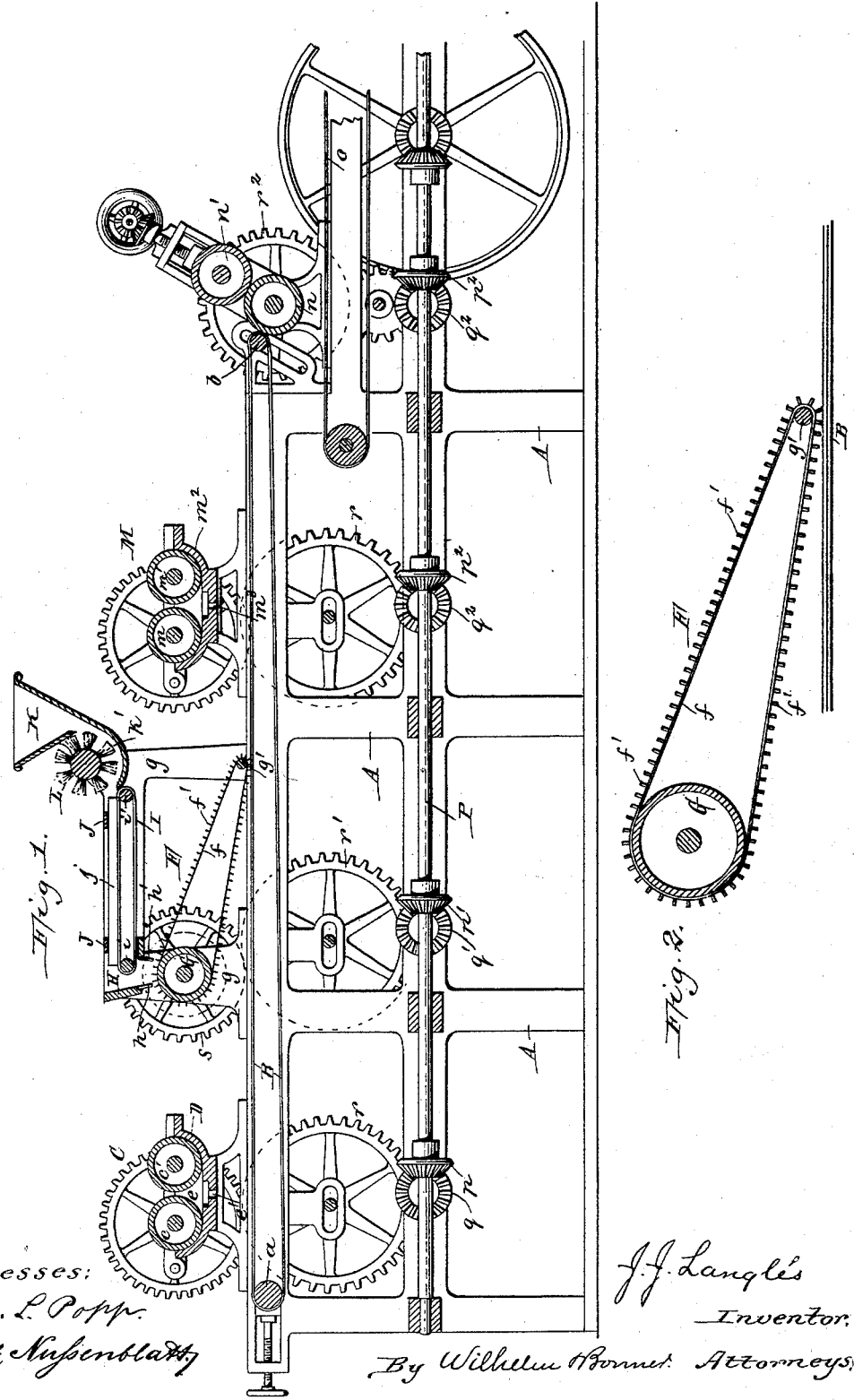
Witnesses:
Theo. L. Popp.
Jacob Nussenblatt.
J. J. Langlés
Inventor.
By Wilhelm Bonner Attorneys.

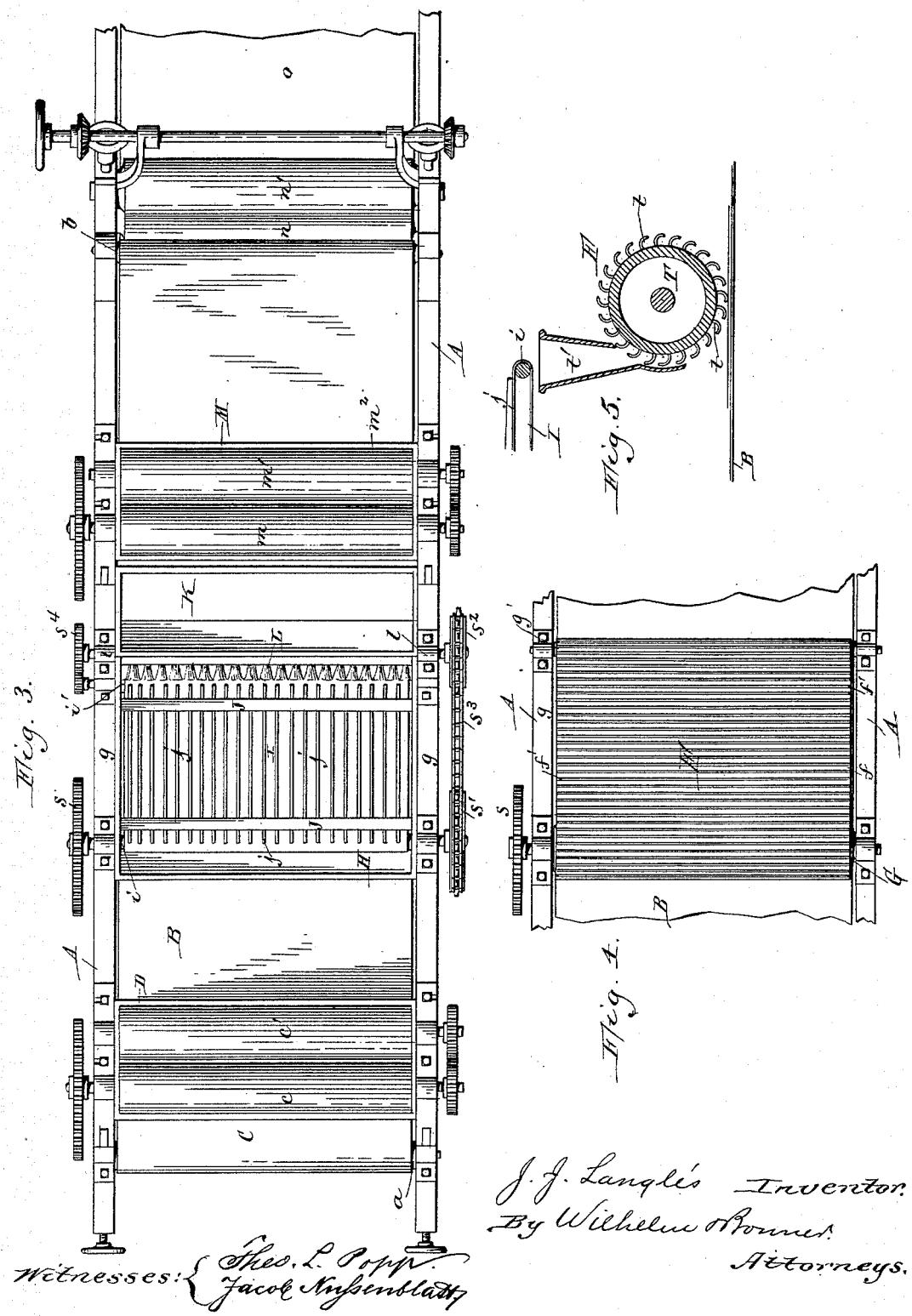

(No Model.) 3 Sheets—Sheet 3.

J. J. LANGLÉS.
CAKE MACHINE.

No. 485,201. Patented Nov. 1, 1892.

Witnesses:
F. G. Wilhelm.
Fred. C. Geyer.

J. J. Langlés
Inventor.
By Wilhelm & Bonner
Attorneys.

UNITED STATES PATENT OFFICE.

JUSTIN J. LANGLÉS, OF NEW ORLEANS, LOUISIANA, ASSIGNOR TO THE AMERICAN BISCUIT AND MANUFACTURING COMPANY, OF ILLINOIS.

CAKE-MACHINE.

SPECIFICATION forming part of Letters Patent No. 485,201, dated November 1, 1892.

Application filed September 12, 1890. Serial No. 364,749. (No model.)

*To all whom it may concern:*

Be it known that I, JUSTIN J. LANGLÉS, a citizen of the Republic of France, residing at New Orleans, in the parish of Orleans and State of Louisiana, have invented a new and useful Improvement in Cake-Machines, of which the following is a specification.

This invention relates to that class of machines in which fruit is delivered between two layers of dough which are subsequently pressed together and formed into fruit-cakes of any desired shape. Heretofore it has been customary to reduce the fruit to a paste or jelly-like mass, which was delivered upon the dough in a thin sheet by suitable rollers.

The object of my invention is to provide a delivery mechanism whereby whole or loose fruit—such as berries, currants, and similar small fruit—can be delivered continuously upon the sheet of dough, thereby avoiding the necessity of previously reducing the fruit to a pasty consistency.

Another object of my invention is to improve the arrangement of the machine so as to permit a continuous sheet of dough to be delivered upon the traveling apron, which will be hereinafter more fully described.

In the accompanying drawings, consisting of three sheets, Figure 1 is a longitudinal sectional elevation of a cake-machine embodying my improvements. Fig. 2 is an enlarged side view of the endless fruit-carrier. Fig. 3 is a top plan view of the machine. Fig. 4 is a top plan view of the fruit-carrier. Fig. 5 is a sectional elevation showing a modified construction of the fruit-carrier. Fig. 6 is a fragmentary sectional elevation of the machine with the second dough-press omitted and the tail end of the main apron lowered to deliver the sheet of dough below the compressing-rollers.

Like letters of reference refer to like parts in the several figures.

A represents the side frames of the machine, and B the main endless traveling apron, which passes around supporting-rollers $a$ $b$, arranged at opposite ends of the machine and journaled in the side frames.

C represents the primary dough-press whereby the first or lower sheet of dough is pressed and delivered upon the main apron. This press consists, essentially, of a pair of parallel rollers $c$ $c'$ and a dough-box D. The dough is placed between the rollers $c$ $c'$, on the upper side thereof, and the latter rotate toward each other and press the dough downwardly into the space $e$, formed in the box below the rollers. The bottom of the dough-box is provided with a discharge-orifice $e'$, through which the dough escapes and is delivered in a thin sheet upon the traveling apron, which carries it toward the rear end of the machine. This dough-press is similar in construction to the press for which Letters Patent of the United States No. 375,168 were granted to me December 20, 1887, and to which reference is here made for a detailed description thereof.

F represents a fruit-carrier whereby a regulated quantity of fruit is deposited upon the sheet of dough as it passes underneath the same. This carrier is arranged in rear of the primary dough-press and provided with an endless apron $f$, provided at short intervals with transverse ribs $f'$. This apron is supported at its front portion by a large roller G, journaled in standards $g$ $g$ on the side frames, while its rear portion passes around a small delivery-roller $g'$, journaled in the side frames. The spaces between the ribs of the carrying-apron form small pockets or receptacles which receive the loose fruit and deposit it upon the sheet of dough. The receiving-roller G is preferably larger and arranged somewhat higher than the delivery-roller $g'$, so that the upper carrying portion of the apron will assume an inclined position. The delivery-roller $g'$, supporting the rear portion of the carrier, is of very small diameter and is placed as closely as possible to the upper side of the sheet of dough. This enables the fruit-carrier to make a short turn at its lower end and deposit the fruit uniformly on the dough. This would not be the case if the delivery-roller were comparatively larger, because the fruit would roll out of the pockets in passing around a roller of larger diameter and spread itself irregularly over the dough before the pockets approached the dough sufficiently close to prevent them from spilling the fruit.

H represents a feed hopper or receptacle arranged over the upper roller of the fruit-carrier. This hopper delivers the fruit into the pockets of the fruit-carrier and is provided on its front and rear ends with depending flexible shields $h$ $h'$, which form a yielding chute between the moving fruit-carrier and the feed-hopper and prevent the escape of the fruit. The rear shield $h'$ also serves to brush off any excess of fruit which may project above the pockets of the carrier.

I represents a distributer whereby the fruit is uniformly distributed in the feed-hopper and the pockets of the carrier. This distributer preferably consists of an endless apron supported in a horizontal position by means of rollers $i$ $i'$.

$j$ represents a series of bars arranged lengthwise above the fruit-distributing apron and supported by cross-bars J J, secured to the standards $g$ $g$. These bars bear against the upper side of the distributing-apron and divide the fruit on the apron into parallel layers while it is being carried toward the feed-hopper and prevent it from creeping laterally on the apron, which would cause it to accumulate on some parts of the apron and produce an irregular delivery of the fruit to the feed-hopper and fruit-carrier.

K represents the main hopper, which supplies the fruit to the distributer. This hopper is arranged adjacent to the receiving end of the distributer and supported on the standards $g$ $g$. The main fruit-hopper is provided with a curved throat K', which terminates near the receiving end of the distributer.

L represents a revolving feed-brush whereby the fruit is brushed from the throat of the hopper upon the fruit-distributing apron. This brush is arranged transversely in the throat of the hopper and is journaled in bearings $l$ $l$ on the standards. The feed-brush is preferably made of soft bristles or similar material, so as to avoid bruising the fruit.

The above-described device for feeding loose fruit is very simple in construction and insures the deposit of a uniform layer of fruit upon the dough. The several parts of the fruit-carrier which propel the fruit and all of the parts against which the fruit bears are made slightly yielding, so as to avoid bruising the fruit; otherwise the escaping juice from the bruised fruit would cause the same to stick together and soon form a pasty mass.

M represents the secondary dough-press, which deposits a layer of dough on top of the layer of fruit which passes underneath the secondary press. The latter is arranged a short distance in rear of the fruit-carrier, and consists, like the primary press, essentially, of two rollers $m$ $m'$ and dough-box $m^2$, provided with an orifice $m^3$ in its bottom, through which the sheet of dough is delivered.

The first or lower layer of dough in passing underneath the fruit-carrier receives a layer of fruit on its upper side, and these two layers in passing underneath the secondary dough-press receive another layer of dough, which is deposited on top of the fruit. These three layers form a continuous triple sheet composed of a layer of fruit between two layers of dough and constitute the completed cake-stock. This stock is now ready to be cut up into cakes by a suitable machine or to be rolled up into rolls preparatory to baking the same.

If desired, the three layers forming the cake-stock may be pressed together into a very thin sheet. For this purpose a separate set of compressing rollers $n$ $n'$ is arranged at the tail of the main apron. The cake-stock passes between these two rollers and is delivered upon a belt $o$ in a thin sheet.

When it is desired to form cake of a single layer of dough having a top dressing of fruit, the secondary dough-press is dispensed with or not supplied with dough. The cake-stock is not run through the compressing-rollers, but is delivered directly on the belt $o$ below the compressing-rollers by lowering the tail end of the main apron, as represented in Fig. 6.

P represents the main shaft from which the several dough-presses and the fruit-carrier are operated. This shaft is journaled lengthwise in the main frame and provided with bevel gear-wheels $p$ $p'$ $p^2$, which mesh with similar wheels $q$ $q'$ $q^2$, secured to the ends of transverse shafts, which latter impart motion to the gear-wheels $r$ $r'$ $r^2$ by suitable intermediate gears. The two rollers of each dough-press are geared together so as to rotate toward each other, and one of the rollers of each press is provided with a driving spur-wheel. These spur-wheels are driven from the main shaft by the spur-wheels $r$ $r'$, the transverse shafts and the bevel-wheels connecting the latter with the main driving-shaft. The receiving-roller of the fruit-carrying apron is provided at one end with a gear-wheel $s$, which meshes with the spur gear-wheel $r'$, while its opposite end is provided with a sprocket-wheel $s'$, connecting with a sprocket-wheel $s^2$ on the end of the brush-shaft by means of a sprocket-chain $s^3$. The brush-shaft is provided at its opposite end with a gear-wheel $s^4$, which meshes with a pinion on the receiving-roller of the fruit-distributer, whereby the latter is propelled. The several presses and the fruit-carrier may, however, be operated in any other suitable manner.

In the modified construction represented in Fig. 5 the fruit-carrier consists of a cylinder T, provided with a series of bucket-shaped pockets $t$ on its periphery. The fruit is delivered into these pockets on one side of the cylinder by means of a hopper $t'$, and as the cylinder revolves the fruit is deposited upon the passing layer of dough. This construction, however, is not as desirable as the carrying-apron, because the fruit has a tendency to roll out of the buckets before the latter have approached the dough closely enough to avoid an irregular deposit of the fruit upon the layer of dough.

I claim as my invention—

1. The combination, with a traveling apron and a dough-delivery device whereby a sheet of dough is delivered upon the apron, of a fruit-receptacle and a fruit-carrier arranged above the apron, whereby the fruit is delivered upon the dough on the traveling apron, substantially as set forth.

2. The combination, with the main traveling apron and a dough-delivery device whereby a sheet of dough is delivered upon the apron, of an endless fruit-carrier arranged above the apron, a distributer whereby the fruit is delivered to the fruit-carrier, and a feed-hopper, substantially as set forth.

3. The combination, with the main traveling apron and a dough-delivery device whereby a sheet of dough is delivered upon the apron, of a main hopper or primary fruit-receptacle, a revolving brush whereby the discharge of the fruit from the same is facilitated, a distributing-apron receiving the fruit from the primary fruit-receptacle, a secondary receptacle into which the fruit is delivered by the distributing-apron, and an endless fruit-carrier receiving the fruit from the secondary receptacle and delivering the same upon the dough on the main apron, substantially as set forth.

4. The combination, with the main traveling apron and a dough-delivery device whereby a sheet of dough is delivered upon the apron, of a main hopper or primary fruit-receptacle, a traveling brush whereby the discharge of fruit from the same is facilitated, a distributing-apron receiving the fruit from the primary receptacle, a series of guide-bars whereby the fruit is guided on said distributing-apron, a secondary receptacle into which the fruit is delivered from said distributing-apron, and an endless fruit-carrier receiving the fruit from the secondary receptacle and delivering the same upon the dough on the apron, substantially as set forth.

5. The combination, with the main apron, of a primary dough-delivery device whereby a sheet of dough is delivered upon the main apron, a fruit-receptacle, an endless fruit-carrier arranged over the main apron in rear of the primary dough-delivery device, whereby loose fruit is delivered upon the sheet of dough, and a secondary dough-delivery device arranged over the main apron in rear of the endless fruit-carrier, whereby the loose fruit is covered with a layer of dough, substantially as set forth.

Witness my hand this 29th day of July, 1890.

JUSTIN J. LANGLÉS.

Witnesses:
J. W. RUGER,
JNO. J. BONNER.